May 19, 1964  R. E. LE CRONIER ETAL  3,134,054
VOLTAGE LEVEL DETECTOR CIRCUITS
Filed Dec. 4, 1961  4 Sheets-Sheet 1

INVENTORS  R. E. LE CRONIER
E. E. SCHWENZFEGER
BY
S E Hollander
ATTORNEY

May 19, 1964  R. E. LE CRONIER ETAL  3,134,054
VOLTAGE LEVEL DETECTOR CIRCUITS
Filed Dec. 4, 1961  4 Sheets-Sheet 2

INVENTORS
R. E. LE CRONIER
E. E. SCHWENZFEGER
BY
S E Hollander
ATTORNEY

INVENTORS R. E. LE CRONIER
E. E. SCHWENZFEGER
BY
SE Hollander
ATTORNEY

| | 1 A | 1 B | | 2 A | 2 B | | 3 A | 3 B | | 4 A | 4 B |
|---|---|---|---|---|---|---|---|---|---|---|---|
| $I_1=5$ | 5KN ↑ | 5N ↓ | $I_1=0$ | 0 | 0 | $I_1=0$ | 0 | 0 | $I_1=0$ | 0 | 0 |
| $I_2=5$ | 5N ↓ | 5KN ↑ | $I_2=0$ | 0 | 0 | $I_2=0$ | 0 | 0 | $I_2=0$ | 0 | 0 |
| | 5N(K-1)↑ | 5N(K-1)↑ | | 0 | 0 | | 0 | 0 | | 0 | 0 |

(b) $E_i = 20V$

| | 1 A | 1 B | | 2 A | 2 B | | 3 A | 3 B | | 4 A | 4 B |
|---|---|---|---|---|---|---|---|---|---|---|---|
| $I_1=13$ | 13KN ↑ | 13N ↓ | $I_1=5$ | 5KN ↑ | 5N ↓ | $I_1=0$ | 0 | 0 | $I_1=0$ | 0 | 0 |
| $I_2=7$ | 7N ↓ | 7KN ↑ | $I_2=5$ | 5N ↓ | 5KN ↑ | $I_2=0$ | 0 | 0 | $I_2=0$ | 0 | 0 |
| | N(13K-7)↑ | N(7K-13)↑ | | 5N(K-1)↑ | 5N(K-1)↑ | | 0 | 0 | | 0 | 0 |

(c) $E_i = 30V$

| | 1 A | 1 B | | 2 A | 2 B | | 3 A | 3 B | | 4 A | 4 B |
|---|---|---|---|---|---|---|---|---|---|---|---|
| $I_1=23$ | 23KN ↑ | 23N ↓ | $I_1=13$ | 13KN ↑ | 13N ↓ | $I_1=5$ | 5KN ↑ | 5N ↓ | $I_1=0$ | 0 | 0 |
| $I_2=7$ | 7N ↓ | 7KN ↑ | $I_2=7$ | 7N ↓ | 7KN ↑ | $I_2=5$ | 5N ↓ | 5KN ↑ | $I_2=0$ | 0 | 0 |
| | N(23K-7)↑ | N(7K-23)↑ | | N(13K-7)↑ | N(7K-13)↑ | | 5N(K-1)↑ | 5N(K-1)↑ | | | |

(d) $E_i = 40V$

| | 1 A | 1 B | | 2 A | 2 B | | 3 A | 3 B | | 4 A | 4 B |
|---|---|---|---|---|---|---|---|---|---|---|---|
| $I_1=33$ | 33KN ↑ | 33N ↓ | $I_1=23$ | 23KN ↑ | 23N ↓ | $I_1=13$ | 13KN ↑ | 13N ↓ | $I_1=5$ | 5KN ↑ | 5N ↓ |
| $I_2=7$ | 7N ↓ | 7KN ↑ | $I_2=7$ | 7N ↓ | 7KN ↑ | $I_2=7$ | 7N ↓ | 7KN ↑ | $I_2=5$ | 5N ↓ | 5KN ↑ |
| | N(33K-7)↑ | N(7K-33)↑ | | N(23K-7)↑ | N(7K-23)↑ | | N(13K-7)↑ | N(7K-13)↑ | | 5N(K-1)↑ | 5N(K-1)↑ |

X = NUMBER OF AMPERE TURNS REQUIRED TO SET FLUX IN EITHER LEG

CONDITIONS

1) $5N(K-1) \geq X$
2) $N(7K-13) < X$
3) $N(7K-23) < X$
4) $N(7K-33) < X$ $5N(K-1) \geq X > N(7K-13)$ INVENTORS R. E. LE CRONIER
E. E. SCHWENZFEGER
BY SE Hollander
ATTORNEY 3,134,054
VOLTAGE LEVEL DETECTOR CIRCUITS
Richard E. Le Cronier, Sea Bright, N.J., and Edward E. Schwenzfeger, Douglaston, N.Y., assignors to Bell Telephone Laboratories, Incorporated, New York, N.Y., a corporation of New York
Filed Dec. 4, 1961, Ser. No. 156,799
27 Claims. (Cl. 317—137)

This invention relates to voltage level detectors and more particularly to voltage level detectors employing ferreeds.

Very often in a communication or other system it is necessary to detect one of a plurality of voltages. For example, in a data link wherein the pulses transmitted may have any one of $n$ amplitudes, the receiving equipment is required to detect which one of these values has been sent. Many present day communication systems feature multilevel pulse transmission rather than ordinary binary transmission. With the advent of these quantized systems, it has become apparent that certain requirements must be met by the voltage level detector in the receiving equipment.

Prior circuits have often employed conventional relays as the voltage level detectors. The detector may comprise $n$ relays. One end of each relay coil is connected to the input source. The other end of each coil is conventionally connected to a different biasing source of potential. The first relay is connected to a first source, the second to a greater potential source, the third to a still greater, etc. In this manner, it is seen that the $j$th input level causes current to flow through the first $j$ relays, the $j$th level exceeding the magnitudes of the potential sources connected to the first $j$ relays. The remaining sources connected to the remaining $n-j$ relays have magnitudes greater than the input pulse, and consequently current does not flow through the associated relays.

The $j$th level, however, is often required to cause only the $j$th relay to operate. It is seen that the first $j-1$ relays also energize when the $j$th level is applied. Means must, therefore, be provided for de-energizing the first $j-1$ relays. This means is often a set of contacts on the $j$th relay itself. When the $j$th relay energizes, at least one set of contacts controlled thereby causes the circuits connected to the first $j-1$ coils to open. The first $j-1$ relays consequently de-energize, and the only relay operated is the $j$th relay.

One of the requirements of the voltage level detector employed in a communication or other system is often that the detector respond to microsecond pulses. Where the incoming pulses are received at a fast rate, it is necessary that the detector circuit respond equally as rapidly. The operating times of conventional relays are in the order of milliseconds, and consequently additional circuitry must be provided in order that these relays be employed in a voltage level detector. This circuitry may be a pulse stretcher or similar device. It is apparent, however, that a great disadvantage of these conventional voltage level detectors is that additional circuitry is required to make the detector relays compatible with the data link.

Another disadvantage of these circuits is that at least one pair of contacts on each relay must be employed to release the first $j-1$ relays or to prevent them from operating. The circuit is not only more complicated, but in addition it is seen that many contacts are employed for controlling the operation of the detector circuit itself rather than their being utilized to control the various external circuits operated by the level detector.

It is an object of this invention to provide an improved voltage level detector.

More specifically, it is an object of this invention to provide a voltage level detector capable of responding to microsecond pulses without requiring intermediate pulse stretching or similar equipment.

It is another object of this invention to provide a voltage level detector wherein each input pulse causes only a single stage to operate, thus obviating the necessity for contacts controlled by this single stage to release lower stages or to prevent them from operating.

In accordance with the invention a ferreed rather than an ordinary relay is employed in each stage of the voltage level detector. The ferreed is a new switching device having many advantages. Among these are reduced size, memory without holding power, and control times in the microsecond range. The present invention utilizes "parallel" ferreeds having differential excitation. This structure is disclosed in the January 1960 issue of the Bell System Technical Journal, pages 1–30. Although parallel ferreeds are illustratively incorporated in the five embodiments of the invention, it is to be understood that other types of ferreed devices, e.g., the series ferreed, are equally advantageous. In the copending application Serial No. 156,800, filed Dec. 4, 1961, of R. E. Le Cronier and M. I. Rackman, the equivalent operation of parallel and series ferreeds in a voltage level detector is more fully disclosed.

The ferreed having differential excitation is characterized by the fact that its contacts close in response to the application of currents to both of the exciting coils contained thereon. The contacts release upon the further application of a pulse of the same polarity to either one of the two coils alone.

As will be more fully described hereinbelow, all windings of each ferreed are connected in series. Biasing or equivalent means are provided for each ferreed stage in order that the $j$th input voltage level cause current flow through both windings of only the first $j$ stages. However, only the $j$th ferreed operates. A Zener diode or PNPN switch is connected to each stage in such a manner that the $j$th input voltage level causes the breakdown of only the first $j-1$ Zener diodes or PNPN switches. The breakdown of these devices causes reductions in the currents flowing through one of the windings in each of the first $j-1$ ferreeds. Effectively, only one winding of each of the first $j-1$ ferreeds is pulsed and consequently these ferreeds do not energize. Only the $j$th ferreed, whose associated Zener diode or PNPN switch does not break down in response to the application of the $j$th input level operates.

In this manner it is seen that the $j$th input level causes the energization of only the $j$th ferreed without requiring one set of contacts on the $j$th ferreed to release the first $j-1$ stages. It is also apparent that the $j$th ferreed energizes responsive to an input pulse of microsecond duration as the ferreed is inherently compatible with high speed systems. It is also apparent that the advantages of the ferreed itself are provided in the circuit. For example, no holding power is required, the ferreed contacts remaining closed without requiring the utilization of a source of potential for continuously biasing the windings once the reeds close, as contrasted with conventional relays which require a latching circuit in order to remain operated after the input pulse has terminated.

It is a feature of this invention to provide a ferreed having differential excitation as the controllable element in each stage of a voltage level detector, all windings of the ferreed being connected in series.

It is another feature of the invention to provide biasing or equivalent means for enabling the $j$th input level to cause current flow through the windings of only the first $j$ stages.

It is still another feature of the invention to provide breakdown means individually connected to each stage for reducing the current flow through one winding of each of the first $j-1$ stages responsive to the application of the $j$th input voltage level.

Further objects, features and advantages of the invention will become apparent upon consideration of the following description in conjunction with the drawing, wherein:

FIG. 7 is a table which will be of aid in the understanding of the operation of the embodiment of FIG. 2.

Figure 1A:
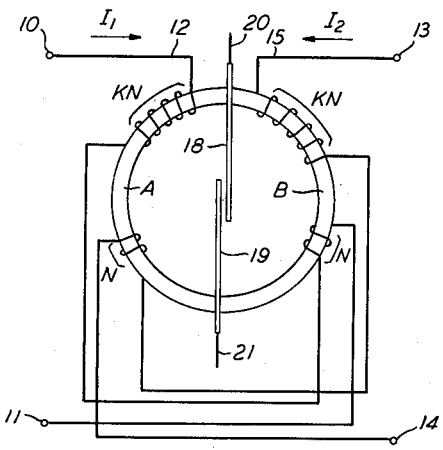
FIG. 1A is a diagrammatic showing of a differentially excited parallel ferreed structure.

Referring to the ferreed structure shown in FIG. 1A, it is seen that the parallel ferreed there illustrated comprises two legs A and B of remanent magnetic material and two reeds 18 and 19 of soft magnetic material. The two reeds are also electrical conductors so that when they close an electrical circuit is completed between conductors 20 and 21.

In the normal condition, the reeds are open. To close the reeds current pulses are applied to conductors 12 and 15 in the directions shown. Conductor 12 is wound around leg A, $kN$ times, and around leg B, N times. Similarly, there are $kN$ turns on leg B in series with N turns on leg A connected between terminals 13 and 14. When the current pulse $I_1$ is applied to conductor 12, it is apparent that a magnetomotive force having a value $kNI_1$ in the upward direction is applied to leg A and a magnetomotive force of $NI_1$ in the downward direction is applied to leg B. Similarly, the current pulse $I_2$ applied at terminal 13 produces a magnetomotive force of value $kNI_2$ in the upward direction in leg B and a magnetomotive force of value $NI_2$ in the downward direction in leg A. If $I_1$ equals $I_2$ the total magnetomotive force in the upward direction in leg A is $NI(k-1)$, where $I=I_1=I_2$, and the total magnetomotive force in the upward direction in leg B is similarly $NI(k-1)$. These two fluxes oppose each other and consequently are directed through the two soft reeds 18 and 19. The fluxes through these reeds cause them to close. The remanent fluxes are set by the application of microsecond pulses. Although the reeds close in a matter of milliseconds, the control pulses need only be of microsecond duration because once the remanent fluxes are set the reeds automatically close. It is also apparent that no holding power is required as the remanent magnetizations persist indefinitely.

To release the reeds a current pulse I need only be applied to conductor 12 or conductor 15. When applied to conductor 12, a magnetomotive force of value $kNI$ in the upward direction is applied to leg A. The magnetization of this leg is already in the upward direction and consequently no change is effected. The same current pulse on conductor 12 applies a magnetomotive force of value $NI$ in the downward direction to leg B. As no current pulse is applied to conductor 15, the total magnetomotive force applied to leg B is in the downward direction and of a value equal to $NI$. This is sufficient for reversing the magnetization of leg B. When the magnetization of leg B reverses, it is seen that the magnetizations of the two legs aid each other, the total flux in the ferreed being in the clockwise direction along the outer perimeter. No flux passes through the two reeds and they therefore open. Similarly, a current pulse applied to conductor 15 reverses the flux in leg A, sets a total counterclockwise flux in the ferreed, and causes the reeds to disengage.

A further discussion of ferreed operation and specifically of differentially excited ferreeds is contained in the above-mentioned Bell System Technical Journal article and in T. N. Lowry application Serial No. 847,918, filed October 22, 1959, now Patent 3,037,085, issued May 29, 1962.

Although, in these prior disclosures, for releasing the ferreed either one of conductors 12 or 15 is pulsed, the other conductor being unenergized, it is apparent that the release of the ferreed may be effected if unequal currents of appropriate magnitudes are applied to the two conductors. For example, if the current pulse applied to conductor 12 is of much greater magnitude than the current pulse applied to conductor 15, the magnetization of leg B still reverses. The magnetomotive force produced by the product of the current in conductor 12 and the N turns on leg B need only exceed the magnetomotive force applied to this same leg by the smaller current in conductor 15 flowing through the $kN$ turns on the leg by a value equal to the magnetomotive force required to switch the remanent magnetization of the leg.

Figure 1B:
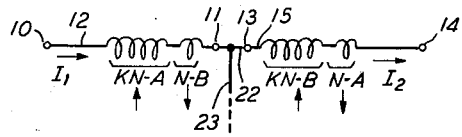
FIG. 1B illustrates schematically the winding connections of the structure of FIG. 1A as utilized in specific embodiments of the invention.

FIG. 1B shows the winding connections of the ferreed of FIG. 1A as it is employed in the embodiments of this invention described below. Terminal 11 is connected by conductor 22 to terminal 13 so that current applied to terminal 10 goes through both conductors 12 and 15. The symbolism $kN-A$ indicates that the current $I_1$ through this winding applies a magnetomotive force of value $kNI_1$ in the upward direction to leg A. The same current applies a magnetomotive force of value $NI_1$ in the downward direction in leg B. Similar remarks apply to the current $I_2$. The currents $I_1$ in conductor 12 and $I_2$ in conductor 15 are not necessarily equal, the relationship depending upon the current flow in conductor 23. Initially the flux in leg A is in the upward direction, the flux in leg B is in the downward direction, and the reeds are open. If $I_1$ equals $I_2$ the ferreed operates. If $I_1$ exceeds $I_2$ by a sufficient amount, the difference current flowing downward to conductor 23, the ferreed remains unoperated. This latter condition arises when the magnetomotive force in the upward direction in leg B having a value $kNI_2-NI_1$ is less than the magnetomotive force required to reverse the magnetization in leg B from the downward to the upward direction.

Figure 2:
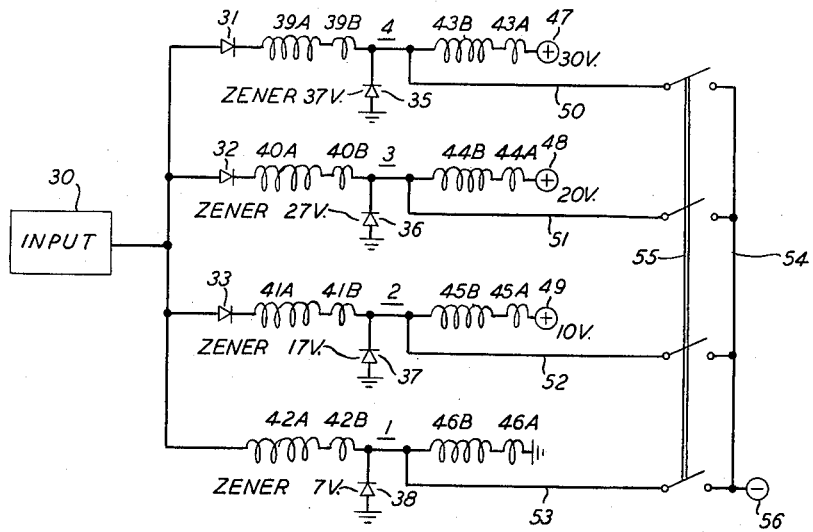
FIGS. 2–6 are schematic representations of five different embodiments of the invention.

FIG. 2 shows a first embodiment of the invention. Only four stages are shown, but it will become apparent hereinbelow that the circuit may be extended to include any number of stages desired. The input voltage is assumed to be 10, 20, 30, or 40 volts. When the input voltage is 10 volts, only ferreed 1 should operate. The number of each ferreed is indicated by the underlined numerals above the junctions of the windings of the ferreeds. A 20-volt input should operate only ferreed 2, a 30-volt input only ferreed 3, and a 40-volt input only ferreed 4.

In the five embodiments of the invention the two windings between terminals 10 and 11, in FIG. 1A, have the same reference number followed by "A" or "B," such as windings 39A and 39B of ferreed 4. When referring to these two windings collectively, the term "winding 39" is used. Similar remarks apply to the other windings.

A Zener diode is connected to each junction of ferreed windings. The breakdown voltage of each of these diodes is 7 volts greater than the magnitude of the source connected to the right-hand winding of the associated stage. These Zener diodes are characterized by the fact that when the voltage across them exceeds the breakdown voltage, they conduct in the reverse direction. Thus, for example, when Zener diode 36 breaks down, the voltage across it is 27 volts, the junction of windings 40 and 44 and the Zener diode being maintained at 27 volts. The current flows in the downward direction through the diode.

The operation of the circuit may be best understood with reference to FIG. 7. The magnetomotive forces applied to legs A and B of ferreed 1 for each of the four input conditions are shown in the leftmost column of the table. The magnetomotive forces applied to both legs of ferreed 2 for the four input conditions are shown in the second column, etc.

Initially the circuit is in the reset condition. The fluxes in legs A of each of the four ferreeds are in the upward direction. The fluxes in legs B of each of the four ferreeds are in the downward direction. As the two fluxes in each ferreed aid each other, no flux is present in the soft reeds, and they remain in their normal open position. The fluxes in the legs B are set in the downward direction by the operation of four-level ganged switch 55. When this switch is operated, each junction of ferreed windings and Zener diode is maintained at the slightly negative potential of source 56. Current flows from right to left in each of the right-hand windings. This is equivalent to current flow from terminal 14 to terminal 13 in FIGS. 1A and 1B. The magnetomotive force applied to each leg B resulting from the current flowing through the $k$N turns on this leg sets the magnetization of the leg in the downward direction. Although this current also applies a magnetomotive force to leg A in the downward direction, this magnetomotive force is insufficient for switching the remanent magnetization of leg A which in the invention is always in the upward direction. As more stages are added to the structure of FIG. 2 and the biasing potentials applied to the upper stages increase in magnitude, it is apparent that the current flowing through the right-hand windings of the upper stages may be large in magnitude when key 55 is operated. In order to insure that this current is sufficient for switching the magnetization of each leg B to the downward direction, but is insufficient for so setting the magnetizations of legs A, resistance elements may be placed in the conductors equivalent to conductors 50–53 for the upper stages. These resistances are not shown so as not to complicate the drawing.

Assume that the input pulse has a magnitude of 10 volts. No current flows through the upper three stages as diodes 31 and 32 are reverse-biased, and there is a zero potential drop across ferreed 2. However, current does flow through ferreed 1. For illustrative purposes it will be assumed that the resistance of each ferreed winding is 1 ohm. The total impedance presented by windings 42 and 46 is thus 2 ohms and consequently 5 amperes of current flow through these two windings. The junction of the two windings is maintained at 5 volts, and Zener diode 38 having a breakdown voltage of 7 volts does not conduct. $I_1$ and $I^2$ are both 5 amperes. As shown in FIG. 7, $I_1$ causes a magnetomotive force of $5k$N ampere turns to be applied to leg A of ferreed 1 in the upward direction and a magnetomotive force of $5$N ampere turns to be applied to leg B in the downward direction. Similarly, $I_2$ causes the same magnetomotive forces to be applied but to opposite legs. The total magnetomotive force applied to each leg is thus $5N(k-1)$ in the upward direction. The magnetization of leg A is already in the upward direction. The magnetization of leg B was reset in the downward direction by the operation of key 55. In order to operate ferreed 1, it is necessary, therefore, that the magnetization of leg B be set in the upward direction. This in turn implies that the magnetomotive force of $5N(k-1)$ ampere turns exceed the switching value.

As no currents flow through either winding of ferreeds 2, 3 and 4, no magnetomotive forces are applied to the respective legs and the ferreeds remain in their unoperated positions.

Assume now that the second input level of 20 volts is applied (after the circuit has been reset). Diode 31 is reverse-biased, a zero potential drop appears across ferreed 3, and no currents flow through the windings of ferreeds 3 and 4. Diode 33 is now forward-biased, the potential drop across it being approximately zero volt. As source 49 has a magnitude of 10 volts, the total potential drop across the windings of ferreed 2 is 10 volts. As 5 volts appear across each winding, the junction of the two windings is maintained at 15 volts. Zener diode 37 does not break down. Referring to FIG. 7, it is seen that the magnetomotive forces applied to the windings of ferreed 2 for the input condition of 20 volts are identical to those applied to the windings of ferreed 1 for the input voltage of 10 volts.

Although ferreed 2 is to operate for the 20-volt input, ferreed 1 should not. Were the Zener diode 38 not to break down, the 20-volt input would cause a 10-volt drop across each of the windings 42 and 46. The junction of the windings would thus be maintained at a potential of 10 volts. Thus the Zener diode must break down. When the diode does break down, the junction is maintained at a potential of 7 volts. As the resistance of winding 46 is 1 ohm, $I_2$ has a value of 7 amperes. $I_1$, on the other hand, has a value of 13 amperes. Six amperes thus flow down through Zener diode 38. Referring to FIG. 1B it is seen that the respective currents of 13 and 7 amperes cause the application of magnetomotive forces to the legs A and B as shown in FIG. 7. For example, $I_1$ causes an upward magnetomotive force to be applied to leg A having a value of $13k$N ampere turns while the magnetomotive force applied to leg B by this current is 13N in the downward direction. The total magnetomotive forces applied to the two legs are as shown; $N(13k-7)$ ampere turns in the upward direction in leg A and $N(7k-13)$ in the upward direction in leg B. The magnetization of leg A is already in the upward direction. The magnetization of leg B is initially in the downward direction. In order that ferreed 1 not operate, it is only necessary that the upward magnetomotive force applied to leg B of this ferreed, having a value of $N(7k-13)$ ampere turns, be less than the magnetomotive force required to switch the remanent magnetization.

When the 30-volt input is applied, diode 31 is still nonconductive, and ferreed 4 does not operate. Diode 32, however, is forward-biased and a ten-volt drop appears across windings 40 and 44 of ferreed 3. Five volts appear across each winding and the junction of the winding is maintained at 25 volts. Zener diode 36 does not break down and $I_1$ equals $I_2$. The 5 amperes through each winding cause magnetomotive forces to be produced as shown in column 3 of FIG. 7. These magnetomotive forces are identical to the magnetomotive forces applied to legs A and B of ferreed 2 when the 20-volt input is applied which in turn are equal to the magnetomotive forces applied to ferreed 1 when the 10-volt input appears.

Diode 33 is also forward-biased and a 20-volt drop appears across winding 41 and 45. Zener diode 37 breaks down, and the junction of the windings is maintained at 17 volts. The currents and magnetomotive forces applied to ferreed 2 are as shown in the third row, second column of FIG. 7. These values are identical to those applied to ferreed 1 when the 20-volt input is applied and ferreed 2 does not operate.

The 30-volt input likewise causes Zener diode 38 to break down and the junction of windings 42 and 46 to be maintained at 7 volts. Seven amperes flow through winding 46 and 23 amperes through winding 42. The magnetomotive forces applied to ferreed 1 are as shown in FIG. 7. In order for this ferreed to remain inoperative, it is only necessary that the magnetomotive force applied to leg B, and having a value equal to $N(7k-23)$ ampere turns, be less than the magnetomotive force required to switch the remanent magnetization of leg B from the downward to the upward direction.

In a similar manner, the application of the 40-volt input causes ferreed 4 to operate. The current and magnetomotive forces applied to this ferreed are as shown in column 4 of FIG. 7. It should be noted that these values are identical to the values applied to ferreeds 1, 2, and 3 when the 10-, 20- and 30-volt respective inputs are applied.

The 40-volt input causes each of Zener diodes 36, 37 and 38 to break down. The currents and magnetomotive forces are as shown in FIG. 7. The magnetomotive forces applied to ferreed 3 when the 40-volt input is applied, are identical to those applied to ferreeds 1 and 2 when the respective 20- and 30-volt inputs are applied. Similarly, the magnetomotive forces applied to ferreed 2 are identical to those applied to ferreed 1 when the 30-volt input is applied. Ferreeds 2 and 3 do not operate.

The 40-volt input, causing Zener diode 38 to break down, results in a current flow of 7 amperes in winding 46 and 33 amperes in winding 42. The resulting total magnetomotive forces are as shown in FIG. 7. In order for ferreed 1 to remain inoperative, it is only necessary that the total magnetomotive force applied to leg B in the upward direction, having a value of $N(7k-33)$ ampere turns, be less than the switching value.

The conditions imposed by the table of FIG. 7 are conveniently summarized as shown. It is assumed that $x$ ampere turns are required to switch the remanent magnetization in either leg. The only condition that need be satisfied for the 10-volt input is that the magnetomotive force applied to leg B be greater than or equal to the value $x$. This is condition 1. Two conditions need be satisfied when the 20-volt input is applied. The condition required, however, for ferreed 2 to operate is the same as that required for ferreed 1 when the 10-volt input is applied. The condition imposed by ferreed 1 for the 20-volt input is that the magnetomotive force applied to leg B be less than the value $x$ in order that the remanent magnetization of this leg remain in a downward direction. The second condition is thus $N(7k-13)<x$.

The conditions imposed for ferreeds 2 and 3 to respectively remain inoperative and operate when the 30-volt input is applied are identical to the first two previous conditions. The new condition is that imposed by the requirement that the magnetization of leg B of ferreed 1 not switch. This is the third condition summarized.

Finally, for the circuit to operate properly when the 40-volt input is applied, a fourth condition is imposed, this new condition again arising from the fact that the magnetization of leg B of ferreed 1 is not to reverse direction. This is condition 4 in the summarized table.

Of the four conditions, it is apparent that the third and fourth conditions are satisfied if the second is. As $k$ and $N$ are positive numbers and $k$ is greater than 1, the left-hand side of the inequality of condition 2 is greater than the left-hand side of the inequalities of conditions 3 and 4. Thus, if the second condition is satisfied so are the third and fourth.

Thus, for the circuit of FIG. 2 to be operative only two conditions need be satisfied. As the circuit is extended and more stages are added, it is apparent that the conditions necessary for their functioning are automatically satisfied provided that each new biasing potential increase by 10 volts and the breakdown voltage of each Zener diode likewise increase by the same value. Each new input voltage causes a new set of conditions to be imposed on the circuit. However, the pattern has already been shown in the table of FIG. 7. The only new condition imposed by the addition of each stage is that the magnetization of leg B in ferreed 1 not reverse. And as seen in the summarized conditions of FIG. 7, this condition is automatically fulfilled provided that condition 2 is met. Thus, stages may be added indefinitely, and the necessary conditions for the operativeness of the circuit are automatically fulfilled.

The two conditions to be met can be summarized by the following inequality: $5N(k-1) \geq x > N(7k-13)$. In many ferreeds $k$ has a value of 2. The inequality thus reduces to $5N \geq x > N$. This inequality is easily met. Ordinary ferreeds may be employed having a given number of turns provided that the current necessary to set the magnetization of either leg provides a total magnetomotive force whose value lies between $N$ and $5N$.

Zener diode 35 may be omitted if only four stages are required as there is no 50-volt or higher input level to break down this diode. The diode is shown however to show a complete fourth stage as very often more than four stages are required. The Zener diode may be omitted from the uppermost stage. The current diverting breakdown devices associated with the uppermost stages in the other embodiments of the invention may be likewise omitted although they are included in the drawing.

Figure 3:
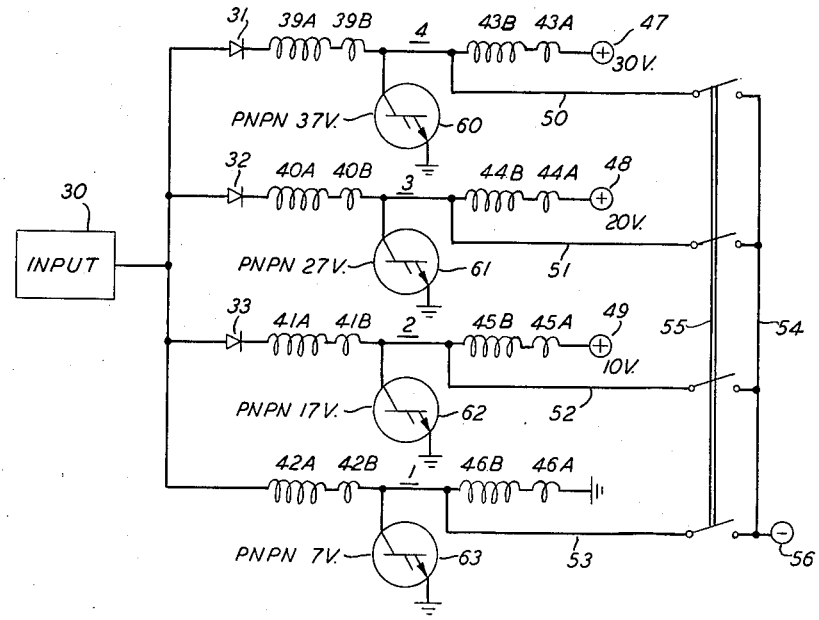

The embodiment of FIG. 3 is identical to that of FIG. 2 except that PNPN diodes have been substituted for the Zener diodes of FIG. 2. The PNPN diodes 60–63, replacing the Zener diodes 35–38 of FIG. 2, have the same breakdown voltages as their counterparts in FIG. 2. PNPN diodes are similar to Zener diodes in that they break down and conduct heavily when their breakdown voltages are exceeded. Of course, they break down in the forward rather than the reverse direction. One of the distinctions between them is that when a PNPN diode breaks down, the voltage drop across it is negligible as contrasted to a Zener diode where the voltage maintained across the diode in the high conduction state is equal to the breakdown voltage. Thus, when any one of the PNPN diodes of FIG. 3 breaks down, the junction of the respective ferreed winding is held to approximately ground potential. When a PNPN diode in FIG. 3 breaks down, not only is there a reduced current in the right-hand winding of the associated ferreed in the direction from left to right, but the current actually flows from right to left. For example, when PNPN diode 62 breaks down, the 10-volt source 49 causes current to flow from right to left in winding 45. Only ferreed 1 has no current flow through winding 46 when the associated PNPN diode 63 breaks down as the winding 46 is then connected to ground at both ends. In either event, however, it is seen that the embodiment of FIG. 3 operates satisfactorily. When the $j$th voltage level is applied by the input source 30, current flows from left to right in both windings of the $j$th ferreed as the $j$th PNPN diode does not break down. All stages above the $j$th have no current flow therein as the diodes connected to the input source are reverse-biased. All stages below the $j$th do not operate as there is no current flow from left to right in the right-hand windings of these stages. Consequently, these lower stage ferreeds remain unoperated with the reeds in the open condition. The conditions set forth in the description of the embodiment of FIG. 2 are automatically met by that of FIG. 3 because the substitution of PNPN diodes for the Zener diodes of FIG. 2 merely results in no current flow from left to right in the right-hand windings of the lower stage ferreeds, and there is no possibility that the reeds of these ferreeds will close.

Figure 4:
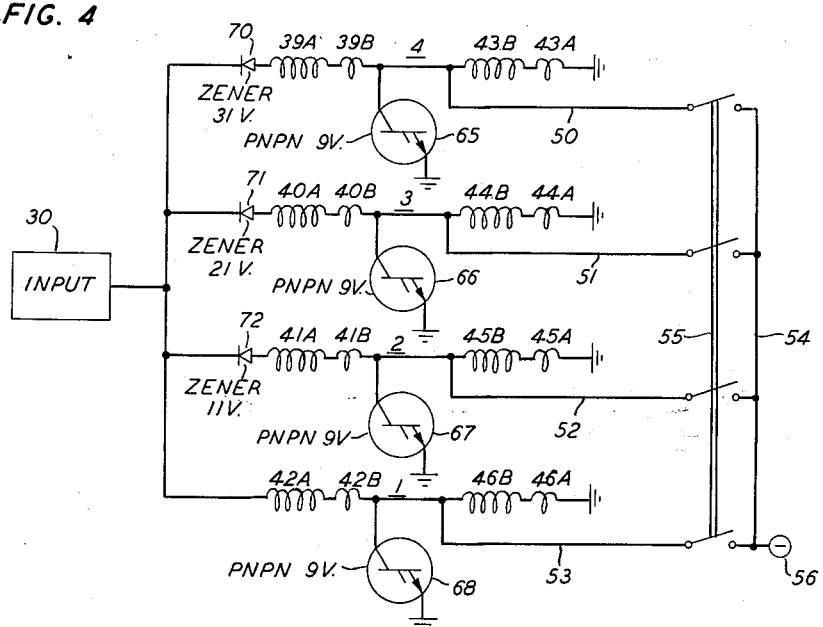

The embodiment of FIG. 4 is different from that of FIG. 3 in three respects. First, it should be noted that all the PNPN diodes have the same breakdown voltage of 9 volts. This is a major advantage because not only are the diodes cheaper when bought in quantity but fewer replacements need be kept on hand in the event of the inoperativeness of any PNPN diode. The second difference is that the conventional diodes 31–33 of FIG. 3 have been replaced by Zener diodes 70–72. The third difference is that the right-hand windings of all ferreeds are now connected to ground rather than to individual potential sources.

When the 10-volt input is applied, Zener diodes 70–72 do not conduct as their breakdown potentials all exceed 10 volts. Current flows only through windings 42 and 46 of ferreed 1. The junction of the windings is at 5 volts and consequently PNPN diode 68, having a breakdown potential of 9 volts, does not conduct. Only ferreed 1 operates. When the 20-volt input is applied only Zener diode 72, having a breakdown potential of 11 volts, breaks down. Nine volts, therefore, appear across windings 41 and 45 with 4.5 volts across each one individually. Current flows through both windings and PNPN diode 67, having a breakdown voltage of 9 volts with only 4.5 volts across it, does not break down. However, PNPN diode 68 does break down. Were it not to do so, 10 volts would appear across its terminals, this voltage exceeding the breakdown potential. When the diode breaks down, the junction of windings 42 and 46 drops to approximately ground potential. The full 20-volt drop appears across winding 42. As there is no drop across winding 46, no current flows therethrough. The lower ferreed does not operate as only one winding is pulsed.

When the 30-volt input is applied Zener diode 71, as well at Zener diode 72, breaks down. Nine volts thus appear across windings 40 and 44 in series. Only 4.5 volts appear across PNPN diode 66 which consequently does not break down. Current flows through both windings and the reeds close.

There is an 11-volt drop across Zener diode 72. Thus, as a result of 30-volt input, 19 volts appear across windings 41 and 45 in series, and the junction of these windings would be maintained at 9.5 volts were diode 67 not to break down. However, this potential exceeds the breakdown voltage of the diode which consequently breaks down. The junction, therefore, drops to ground potential, no current flows through winding 45 and the ferreed remains unoperated. Similarly, the 30 volts across windings 42 and 46 in series cause diode 68 to break down and ferreed 1 does not operate.

The 40-volt input causes all the Zener diodes to break down. Again, only 9 volts appear across the two windings in series of the upper most stage and the associated switch having thereacross only 4.5 volts does not break down. The upper stage operates. The third stage has 19 volts across the two windings in series. Its reeds do not close for the same reason that ferreed 2 was unoperated when the 30-volt input was applied. Stage 2 also does not operate for the same reason that stage 1 did not operate when the 30-volt input was applied. And again, stage 1 does not operate as PNPN diode 68 breaks down.

As in the first two embodiments of the invention, stages may be added indefinitely to the four stages shown in FIG. 4. The Zener diode breakdown potential of each stage need merely increase by 10 volts.

Figure 5:
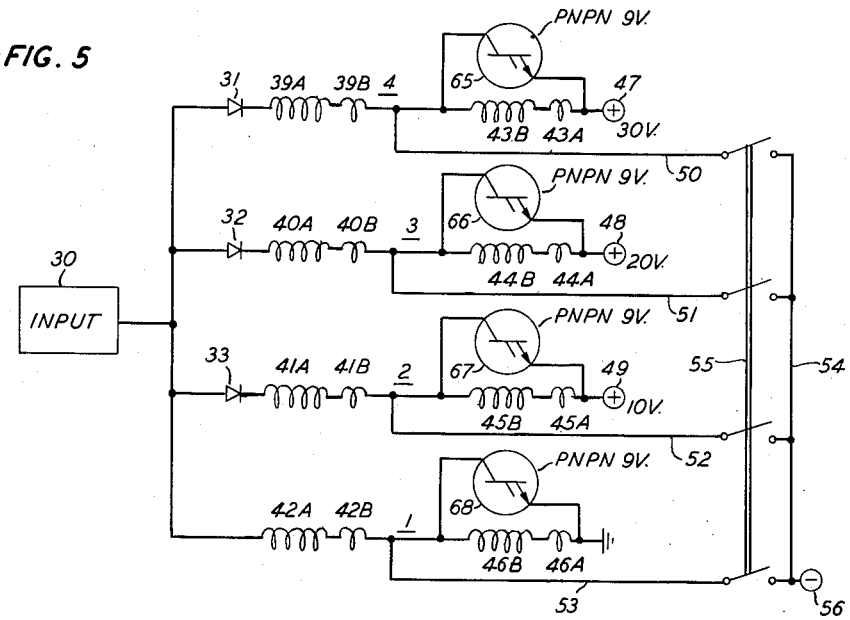

The embodiment of FIG. 5 is similar to that of FIG. 3, except that each PNPN diode is connected directly across the associated right-hand winding rather than from the junction of two windings to ground. This circuit has the advantage that the PNPN diodes all have the same breakdown potential of 9 volts.

The circuit operation is easily understood. The 10-volt input causes current to flow only through the windings of ferreed 1. Diodes 31–33 are reverse or zero-biased due to the respective sources 47–49. Five volts appear across each of windings 42 and 46. Diode 68 does not break down as the 9-volt breakdown potential is not exceeded. The lower stage ferreed operates.

The 20-volt input forward biases diode 33. There is a 5-volt drop across each of windings 41 and 45 and consequently diode 67 having a 9-volt breakdown potential does not conduct. The reeds of ferreed 2 close.

The 20-volt input would result in a 10-volt drop across each of the windings 42 and 46 were diode 68 not to break down. As the diode has only a 9-volt breakdown potential, however, it does break down. All 20 volts appear across winding 42 and approximately zero volt across winding 46. In the high conduction state a PNPN diode offers negligible resistance. Consequently, all current is diverted to diode 68 and no current flows in winding 46. Ferreed 1, therefore, does not operate.

In a similar manner, the 30-volt input results in a 5-volt drop across each of the windings 40 and 44, and the third stage operates. The second stage, however, has 20 volts across the two windings in series, diode 67 breaks down, and no current flows through winding 45. Ferreed 1 with a 30-volt drop across both windings similarly does not operate as diode 68 breaks down. The 40-volt input resulting in a 5-volt drop across each of windings 39 and 43 with a 5-ampere current in each of them causes the reeds of the fourth stage to close. Twenty volts appear across the two windings of stage 3 and diode 66 breaks down in the same manner that diode 67 breaks down when the 30-volt input is applied. In a similar manner, diodes 67 and 68 break down in response to the application of the 40-volt input, and the only operated ferreed is that associated with stage 4.

It is apparent that stages may be added indefinitely, the biasing source of each stage merely increasing by 10 volts to insure the operativeness of the circuit.

The embodiment of FIG. 2 requires individual biasing means as well as a Zener diode having a different breakdown potential for each stage. The embodiment of FIG. 3 similarly requires a different voltage source for each stage and a different valued PNPN diode for each level. In the embodiment of FIG. 4 no individual biasing sources are required, and the PNPN diodes associated with each stage all have the same breakdown potential of 9 volts. The only difference between stages relates to the breakdown potentials of the respective Zener diodes. In the embodiment of FIG. 5 only PNPN diodes are required, these diodes all having the same breakdown potential but individual biasing means are required for each stage.

Figure 6:
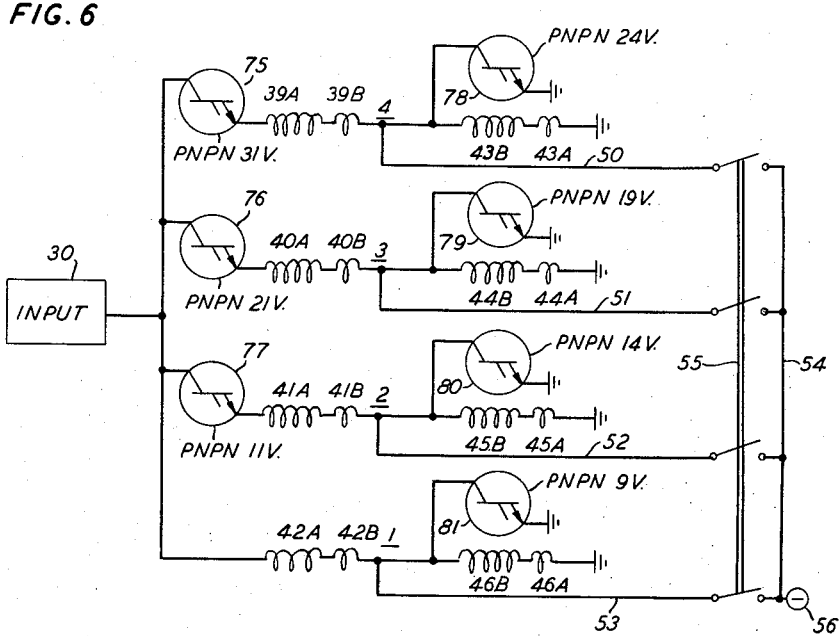

In the embodiment of FIG. 4 the PNPN diodes all have the same breakdown potential of 9 volts, but each stage requires a different Zener diode. In the event that it is desired to use a circuit without individual biasing sources and utilizing only PNPN diodes rather than Zener diodes as well for the sake of uniformity, the PNPN diodes 75–77 of FIG. 6 may be substituted for the Zener diodes 70–72 of FIG. 4. In both circuits, the jth input level breaks down only the first j breakdown devices, and current flows only through the lowest j stages. In FIG. 6, however, the PNPN diodes 78–81 have different breakdown potentials as contrasted with the PNPN diodes 65–68 of FIG. 4. This is due to the fact that the PNPN diodes 75–77 in the breakdown condition have approximately a zero voltage maintained across their terminals as contrasted with the Zener diodes 70–72 whose voltages equal their respective breakdown potentials.

In the embodiment of FIG. 6, the 10-volt input operates the lowest stage in a manner identical to the operation of ferreed 1 in FIG. 4. The 20-volt input does not operate ferreed 1 in FIG. 6 for the same reason that this ferreed is unoperated in the embodiment of FIG. 4. The 20-volt input appears across windings 41 and 45 in FIG. 6 as the voltage across diode 77 is approximately zero. Consequently, there is a 10-volt drop across winding 45. Were PNPN diode 80 to have a breakdown voltage of 9 volts as PNPN diode 67 in FIG. 4, it would break down in response to the application of the 20-volt input and ferreed 2 would be unoperated. For this reason, PNPN diode 80 has a 14-volt breakdown potential. This diode breaks down only when the 30- and 40-volt inputs are applied and the respective voltages of 15 and 20 volts are initially impressed across it.

PNPN diode 79 has a breakdown potential of 19 volts. This diode does not break down when the 30-volt input is applied and 15 volts are impressed across winding 44. It does break down, however, when the 40-volt input is applied and 20 volts are initially impressed across winding 44.

In a similar manner, PNPN diode 78 has a breakdown potential of 24 volts. This diode does not break down when the 40-volt input is applied, but would were a 50-volt input to be applied. This diode is not required in the embodiment of FIG. 6 where only four different input voltages are applied. As in the other embodiments, however, the fourth stage is shown as it would appear were there any stages above it.

It is thus seen that the five embodiments of the invention are improved voltage level detectors. Each stage responds to a microsecond input, and no contacts of the individual stages are required for releasing the lower stages. The embodiments of FIGS. 4 and 6 do not require individual voltage sources for each stage. The embodiment of FIG. 5 utilizes only PNPN diodes all having the same breakdown potential. All of the embodiments offer numerous advantages both collectively and individually.

It should be noted that although the ferreeds used in the illustrative embodiments each have four individual windings, windings 43A–46A may be omitted with minor changes being made in the breakdown potentials of various ones of the breakdown devices shown and in the number of turns on various ones of the other windings.

Although five specific embodiments of the invention have been shown and described, it will be understood that they are but illustrative and that various modifications may be made therein without departing from the spirit and scope of the invention.

What is claimed is:

1. A voltage level detector comprising a plurality of differentially excited ferreeds each having first and second windings connected in series, means connected to the first windings of all of said ferreeds for applying any one of a plurality of voltage levels, voltage source biasing means individually connected to the second ones of all of said windings, and a plurality of voltage breakdown means each having a different breakdown voltage connected to respective ones of the junctions of said windings each responsive to the voltage across it exceeding the breakdown voltage to divert sufficient current to prevent the associated ferreed from operating.

2. A voltage level detector comprising a plurality of differentially excited ferreeds each having first and second windings connected in series, means connected to the first winding of each of said ferreeds for applying any one of a plurality of voltage levels, means individually connected to the windings of said ferreeds responsive to the application of any one voltage level for preventing current flow through both windings of any ferreed for which said one voltage level is lower than a predetermined value, and a plurality of voltage breakdown means each having a breakdown voltage connected to respective ones of the junctions of said windings each responsive to the voltage across it exceeding the breakdown voltage to divert sufficient current to prevent the associated ferreed from operating.

3. A voltage level detector comprising a plurality of ferreeds each having first and second windings, input voltage means connected to the windings of all of said ferreeds, voltage breakdown means individually connected to the windings of each of said ferreeds, and other means individually connected to the windings of each of said ferreeds for controlling jointly with said individual breakdown means equal currents to flow through both windings of only one of said ferreeds and for controlling no currents and nonequal currents to flow through both windings of all others of said ferreeds.

4. A voltage level detector comprising a plurality of ferreeds each having first and second windings, input voltage means connected to the windings of all of said ferreeds, and means individually connected to the windings of each of said ferreeds for controlling equal currents to flow through both windings of only one of said ferreeds and for controlling no currents and nonequal currents to flow through both windings of all others of said ferreeds.

5. In combination, a plurality of differentially excited ferreeds each having first and second windings, input voltage means connected to said first winding of each of said ferreeds for applying an input voltage, biasing means individually connected to said second winding of each of said ferreeds for controlling current flow through said first and second windings of each of said ferreeds responsive only to said input voltage exceeding a respective first predetermined value, and voltage breakdown means individually connected to said first and second windings of each of said ferreeds for reducing the current through said second winding of each of said ferreeds responsive to said input voltage exceeding a respective second higher predetermined value.

6. In combination, a plurality of differentially excited ferreeds each having first and second windings, input voltage means connected to said first winding of each of said ferreeds for applying an input voltage, means individually connected to the windings of said ferreeds for controlling current flow through said first and second windings of each of said ferreeds responsive only to said input voltage exceeding a respective first predetermined value, and means individually connected to said first and second windings of each of said ferreeds for preventing the operation of each of said ferreeds responsive to said input voltage exceeding a respective second higher predetermined value.

7. A voltage level detector for energizing selected ferreed devices responsive to respective input voltages comprising a plurality of ferreeds each having first and second windings, any one of said ferreeds being energized responsive to the flow of currents exceeding a predetermined value through both of said first and second windings, input voltage means connected to the windings of each of said ferreeds for controlling current ordinarily to flow through both windings of each of said ferreeds, means connected to the windings of said ferreeds for inhibiting current flow through both windings of predetermined groups of said ferreeds responsive to the application of respective input voltages, and means for inhibiting current flow through one winding of each of the remaining ferreeds except one from exceeding said predetermined value responsive to said respective input voltages.

8. A voltage level detector for energizing selected devices responsive to respective input voltages comprising a plurality of devices each having first and second input terminals, any one of said devices being energized responsive to the flow of currents exceeding a predetermined value into both of said first and second terminals, input voltage means connected to each of said devices for controlling current ordinarily to flow into both terminals of each of said devices, means connected to said devices for inhibiting current flow into both terminals of predetermined groups of said devices responsive to the application of respective input voltages, and means for inhibiting current flow into one terminal of each of the remaining devices except one from exceeding said predetermined value responsive to said respective input voltages.

9. A voltage level detector comprising a plurality of differentially excited ferreeds each having first and second windings connected in series, a reference potential connected to said first winding of each of said ferreeds, a first plurality of voltage breakdown means individually connected between the junctions of respective ferreed windings and said reference potential, a second plurality of voltage breakdown means individually connected to respective ones of said second windings, and input voltage means connected to each of said second plurality of voltage breakdown means for operating only a single one of said ferreeds.

10. A voltage level detector comprising a plurality of differentially excited ferreeds each having first and second windings connected in series, biasing means individually connected to said first winding of each of said ferreeds, a plurality of voltage breakdown means individually connected to the junctions of respective ferreed windings, a plurality of unilateral conducting means individually connected to respective ones of said second windings, and input voltage means connected to each of said unilateral conducting means for operating only a single one of said ferreeds.

11. A voltage level detector in accordance with claim 10 wherein said unilateral conducting means are voltage breakdown devices.

12. A voltage level detector comprising a plurality of ferreeds each having first and second windings connected in series, a source of reference potential, Zener diode means having breakdown voltages individually connecting the junctions of said windings to said reference potential, a plurality of potential sources individually connected to one winding of each of said ferreeds, unilateral conducting means individually connected to the other winding of each of said ferreeds, and input voltage means connected to said unilateral conducting means for operating a single ferreed responsive to respective input voltages.

13. A voltage level detector in accordance with claim 12 wherein the breakdown voltage of the Zener diode and the magnitude of the potential source of each stage are both greater than the respective magnitudes of the Zener diode breakdown voltage and the potential source associated with the ferreed responsive to the next lower input voltage.

14. A voltage level detector comprising a plurality of ferreeds each having first and second windings connected in series, a source of reference potential, PNPN diode means having breakdown potentials individually connecting the junctions of said windings to said reference potential, a plurality of potential sources individually connected to one winding of each of said ferreeds, unilateral conducting means individually connected to the other winding of each of said ferreeds, and input voltage means connected to said unilateral conducting means for operating a single ferreed responsive to respective input voltages.

15. A voltage level detector in accordance with claim 14 wherein the breakdown potential of the PNPN diode and the magnitude of the potential source of each stage are both greater than the respective magnitudes of the PNPN diode breakdown potential and the potential source associated with the ferreed responsive to the next lower input voltage.

16. A voltage level detector comprising a plurality of ferreeds each having two windings connected in series, a source of reference potential connected to one winding of each of said ferreeds, a plurality of PNPN diodes each having the same breakdown potential individually connected between the junctions of said windings and said reference potential, Zener diode means each having a different breakdown voltage individually connected to the other of said windings in each of said ferreeds, and input voltage means connected to said Zener diode means for controlling the breakdown of respective pluralities of said Zener diode means and said PNPN diode means responsive to the application of respective input voltages.

17. A voltage level detector comprising a plurality of ferreeds each having two windings connected in series, a plurality of potential sources individually connected to one winding of each of said ferreeds, a plurality of unilateral conducting means individually connected to the other winding of each of said ferreeds, input voltage means connected to said plurality of unilateral conducting means, and a plurality of PNPN diodes all having the same breakdown potential individually connected across said one windings of said ferreeds for preventing current flow through said one windings responsive to the breakdowns of said PNPN diodes.

18. A voltage level detector comprising a plurality of ferreeds each having first and second windings connected in series, a source of reference potential connected to said first winding of each of said ferreeds, a plurality of PNPN diodes each having a different breakdown potential individually connected to said second windings, input voltage means connected to said first plurality of PNPN diodes, and a second plurality of PNPN diodes each having a different breakdown potential individually connecting the junctions of said windings to said reference potential for preventing current flow through said first windings responsive to the breakdown of said diodes in said second plurality.

19. A device comprising a plurality of ferreeds each having first and second members of remanent magnetic material, input voltage means for applying one of a plurality of $n$ input voltage levels, and means for operating only a single ferreed responsive to the application of a respective one of said input voltage levels, said operating means including means for applying first and second magnetomotive forces to said first and second members of only the first $j$ ferreeds responsive to the application of the $j$th input voltage level, and means for controlling said first and second magnetomotive forces applied to the first $j-1$ ferreeds to be unequal in magnitude whereby said first $j-1$ ferreeds are not operated.

20. A voltage level detector comprising a plurality of ferreeds each having first and second windings and first and second members of remanent magnetic material, said first and second windings being wound around said first and second members in such a manner that a current $I_1$ in said first winding applies a magnetomotive force of $kNI_1$ ampere-turns to said first member in a first direction and a magnetomotive force of magnitude $NI_1$ to said second member in a second direction, said second winding being wound around said first and second members in such manner that a current $I_2$ in said second winding applies a magnetomotive force of $NI_2$ to said first member in said second direction and a magnetomotive force of $kNI_2$ to said second member in said first direction, each of said ferreeds operative in response to a magnetomotive force in said first direction whose magnitude is greater than a predetermined value being applied to said first and second members, and wherein $k$ and $N$ are integers; means connecting said first and second windings of each of said ferreeds in series; input voltage means for applying one of a plurality of input voltage levels; and means for operating a single ferreed responsive to the application of a respective input voltage level, said operating means including means for inhibiting current flow in both windings of all ferreeds operative responsive to the application of voltage levels higher than the voltage level applied by said input means, and means for diverting currents from said junctions of all of said ferreeds operative responsive to the application of voltage levels lower than the voltage level applied by said input means whereby the current $I_2$ applied to said second windings of said ferreeds is less than the current $I_1$ applied to said first windings of said ferreeds by such an amount that the magnetomotive forces applied to said second members of said ferreeds are less than said predetermined value.

21. An electrical circuit comprising a differentially excited ferreed having a first winding and a second winding connected in series, reference voltage means connected to one of said windings, voltage input means connected to the other of said windings ordinarily to cause equal currents to flow through said series connected windings, and voltage breakdown means connected to the junction of said first and said second windings to divert current from one of said windings to cause unequal currents to flow in said windings.

22. An electrical circuit comprising a plurality of differentially excited ferreeds each having a first and a second winding connected in series, reference voltage means connected to each of said second windings, voltage input means connected to each of said first windings ordinarily to cause equal currents to flow through the series connected windings of each of said ferreeds, and individual voltage breakdown means connected to the junction of said first and said second windings of each of said ferreeds to divert current from one of said ferreed windings to cause unequal currents to flow in said windings.

23. An electrical circuit in accordance with claim 22 wherein each of said individual voltage breakdown means has a distinct breakdown voltage.

24. An electrical circuit in accordance with claim 22 further comprising means series connected with each of said ferreed series windings for causing current flow through said windings only for predetermined input voltages from said voltage input means.

25. An electrical circuit comprising a ferreed having a first and a second winding connected in series, input means for causing equal currents to flow in said series connected windings to set said ferreed in a first state, and means connected to the junction of said first and second series windings to cause unequal currents to flow in said first and second windings to set said ferreed in a second state.

26. An electrical circuit in accordance with claim 25 wherein said last mentioned means comprises a voltage breakdown device.

27. An electrical circuit comprising a ferreed having a first and a second winding connected in series, reference voltage means connected to one of said windings, input voltage means connected to the other of said windings for applying equal currents to said series connected windings to cause said ferreed to assume a first state, and means connected to the junction of said first and second windings to change the current in at least one of said windings to cause said ferreed to assume a second state.

References Cited in the file of this patent

UNITED STATES PATENTS

| | | |
|---|---|---|
| 2,933,658 | Diamond et al. | Apr. 19, 1960 |
| 2,976,520 | Reenstra | Mar. 21, 1961 |
| 3,005,072 | Brown | Oct. 17, 1961 |
| 3,041,469 | Ross | June 26, 1962 |